United States Patent [19]

Dennehey et al.

[11] 4,225,688
[45] Sep. 30, 1980

[54] COPOLYESTER COMPOSITION CONTAINING POLY(ETHYLENE CYCLOHEXANE DIMETHYLENE TEREPHTHALATE), HAVING SUPERIOR SOLVENT AND IMPACT RESISTANCE

[75] Inventors: T. Michael Dennehey, Arlington Heights; Dwight Dixon, McHenry, both of Ill.

[73] Assignee: Baxter Travenol Laboratories, Inc., Deerfield, Ill.

[21] Appl. No.: 959,114

[22] Filed: Nov. 9, 1978

[51] Int. Cl.$^2$ .............................................. C08L 67/02
[52] U.S. Cl. ................................... 525/444; 428/483; 525/931
[58] Field of Search .......................... 260/860; 525/444

[56] References Cited

U.S. PATENT DOCUMENTS

| | | | |
|---|---|---|---|
| 3,849,515 | 11/1974 | Muller | 260/860 |
| 3,907,926 | 9/1975 | Brown | 260/860 |
| 4,125,571 | 4/1978 | Scott et al. | 260/860 |

*Primary Examiner*—Theodore E. Pertilla
*Attorney, Agent, or Firm*—Paul C. Flattery; Garrettson Ellis

[57] ABSTRACT

A copolyester compositon which exhibits good bonding characteristics to polyvinyl chloride, good impact resistance, and improved resistance to crazing or cracking in the presence of solvents such as alcohol. The composition consists essentially of (a) 80 to 95 percent by weight of a generally rigid poly(ethylene cyclohexanedimethylene terephthalate) in which from 2 to 20 molar parts of ethylene units are present per one molar part of cyclohexanedimethylene units, and (b) from 5 to 20 percent by weight of a flexible copolymer containing alternating covalently bonded blocks of poly(butylene terephthalate) and poly(1,4-butylene ether).

7 Claims, No Drawings

COPOLYESTER COMPOSITION CONTAINING POLY(ETHYLENE CYCLOHEXANE DIMETHYLENE TEREPHTHALATE), HAVING SUPERIOR SOLVENT AND IMPACT RESISTANCE

BACKGROUND OF THE INVENTION

In the disposable medical equipment field, various biomedical sets such as the Travenol AV Fistula Cannulation Set and other hemodialysis blood sets require certain rigid parts such as the female luer adaptor, which must be bonded to the polyvinyl chloride tubing.

Accordingly, the rigid material which would be desired should be injection-moldable without brittleness, resistant to contact with alcohol without cracking or crazing, and solvent bondable, particularly to polyvinyl chloride plastic materials. Also, the material should be stable in the presence of ethylene oxide gas and radiation to permit sterilization by those techniques.

A copolyester material known as poly(ethylene cyclohexanedimethylene terephthalate) is sold by the Eastman Kodak Company, for example, under the trademark KODAR PETG 6763. This material is basically a polyester of polyethylene terephthalate, modified with a diol product which is also sold by the Eastman Kodak company under the name of cyclohexanedimethanol, having a number average molecular weight of about 26,000. The copolymer material bonds to the plasticized polyvinyl chloride plastic well, but it exhibits certain processing and other problems.

For example, the KODAR PETG 6763 material can be injection-molded at temperatures above 390° F.. However, at temperatures of 420° F. and above, the material degrades, making it brittle. This results in a difficult injection-molding process, since the molding range is quite narrow. Also, at the low end of the molding range or below, the plastic becomes brittle because of molded-in stress.

As a result of this, in the molding work which we were involved with concerning the KODAR material, certain lots of the molded luer adaptors proved to be unduly brittle, and also when contacted with alcohol tended to crack, in view of high molding stresses present in the material.

In accordance with this invention, an improved composition is provided which exhibits good bonding characteristics toward polyvinyl chloride plastics, yet which also is much tougher than the previously discussed material, and is much less likely to form intermittent cracks in the presence of alcohol.

Furthermore, the material of this invention can be injection-molded at temperatures as low as 360° F., and has a higher degradation temperature of about 430° F., which permits continuous and reliable commercial scale injection molding processes without encountering the occasional brittleness that was previously encountered.

Interestingly, the material of this invention as it is formed is not formed in a single phase, but has a pearlescent look about it, implying a certain phase incompatibility (i.e., multiple phases) between the ingredients. Nevertheless, and most surprisingly, the physical properties of these materials remain good although it would be normally predicted from this that the physical properties would be poor.

DESCRIPTION OF THE INVENTION

In accordance with this invention, a copolyester composition is provided which exhibits good bonding characteristics to polyvinyl chloride plastics, good impact resistance, and improved resistance to alcohol. The formulation consists essentially of:

(a) from 80 to 95 percent by weight of a generally rigid poly(ethylene cyclohexanedimethylene terephthalate) in which preferably from two to twenty molar parts of ethylene units are present per one molar part of cyclohexanedimethylene units; and (b) from 5 to 20 percent by weight of a flexible copolymer containing alternating, covalently bonded blocks of poly(butylene terephthalate) and poly(1,4-butylene oxide).

One embodiment of ingredient (a) is commercially available as the KODAR PETG 6763 described previously.

Ingredient (b) is a flexible block copolymer of polyester blocks: the poly(butylene terephthalate), with the balance comprising alternating polyether blocks, i.e., the poly(1,4-butylene ether). A type of ingredient (b) is available from the E. I. DuPont deNemours & Co. under the tradename HYTREL, specifically HYTREL 4056. The polyether blocks preferably comprise from 50 to 70 percent by weight of the composition, for example 60 percent.

The above two materials are available in pellet form, so that the composition of this invention may be made by simply mixing the pellets in their proper ratio and pouring into an injection molding machine. The molding screw takes care of the final mixing in the melted state, so that the formulation of the material can take place simultaneously with the molding process.

As stated, it is generally preferable to injection mold the material of this invention at a molding temperature of 380° to 410° F., which gives a substantial range on each side of the preferred temperature range as a margin for error before the material becomes too stiff for easy molding at the lower temperature side, or the material begins to degrade at the higher temperature side.

The resulting injection moldable composition is rigid but tough, and injection moldable without brittleness, while still retaining the capability to be easily solvent bonded to polyvinyl chloride plastic formulations. As stated before, the material is alcohol-resistant and has good ethylene oxide and radiation resistance, permitting sterilization by those routes.

Specifically, about ten percent of ingredient (b) may be present. However, if a more flexible material is desired, higher percentages of the ingredient (b) may be used, while if a harder and stiffer material is desired, less of the ingredient (b) may be used.

The impact resistance is correspondingly altered by differing amounts of ingredient (b).

Typically, ingredient (b) of this invention may exhibit a melt flow rate of 5 to 10 grams per 10 minutes at 200° C. and at a 2160 gram load per the test described in ASTM D1238.

Specifically, ingredient (b) may have a melt flow rate of 7.0 grams per 10 minutes under the conditions described above and a hardness of 40D on the scale of the Shore Durometer (ASTM D2240).

Ingredient (a), a generally rigid copolymer, may be a non-crystalline material with a glass transition temperature of approximately 80° C.. Generally, materials with a glass transition temperature of at least about 60° C., may be used.

Preferably, in ingredient (a) from two to twenty molar parts of ethylene units are present per one molar part of the cyclohexanedimethylene units.

The resulting composition accordingly provides significant improvements, particularly for the specialized requirements of disposable medical devices, with improved ease of molding and the other advantages as described above.

The above has been offered for illustrative purposes only, and is not intended to limit the scope of the invention of this application, which is as defined in the claims below.

That which is claimed is:

1. A copolyester composition which exhibits good bonding characteristics to polyvinyl chloride plastics, good impact resistance, and improved resistance to alcohols, which consists essentially of:
   (a) from 80 to 95 percent by weight of a generally rigid poly(ethylene cyclohexanedimethylene terephthalate) in which from 2 to 20 molar parts of ethylene units are present per one molar part of cyclohexane dimethylene units; and
   (b) from 5 to 20 percent by weight of flexible copolymer containing alternating covalently bonded blocks of poly(butylene terephthalate) and poly(1,4-butylene oxide).

2. The copolyester of claim 1 in which said flexible copolymer exhibits a melt flow rate of 5 to 10 grams per 10 minutes at 200° C. and a 2160 gram load (ASTM D1238).

3. The copolyester of claim 2 in which said generally rigid copolymer is a non-crystalline material with a glass transition temperature of appoximately 80° C.

4. The copolyester of claim 1 in which essentially 10 percent by weight of said flexible copolymer is present.

5. The copolyester of claim 1 in which multiple phases are present.

6. The copolyester of claim 5 in which the degradation temperature is in excess of 420° F.

7. The copolyester of claim 1 in which said generally rigid copolymer is a non-crystalline material with a glass transition temperature of approximately 80° C.

* * * * *